United States Patent [19]

Tsujikado et al.

[11] Patent Number: 5,477,672

[45] Date of Patent: Dec. 26, 1995

[54] HIGH-TEMPERATURE, HIGH-PRESSURE GAS GENERATION APPARATUS FOR TURBINE DRIVE

[75] Inventors: Nobuo Tsujikado, Yokohama; Masatoshi Koshimae, Kobe; Masanori Yoshida, Miki, all of Japan

[73] Assignee: Kawasaki Jukogyo Kabushiki Kaisha, Japan

[21] Appl. No.: 323,773

[22] Filed: Oct. 17, 1994

[30] Foreign Application Priority Data

Nov. 20, 1993 [JP] Japan ..................................... 5-314414

[51] Int. Cl.$^6$ ..................................................... F02C 3/20
[52] U.S. Cl. ................................. 60/39.462; 60/267
[58] Field of Search ......................... 60/218, 39.461, 60/39.462, 39.55, 39.75, 259, 723, 267

[56] References Cited

U.S. PATENT DOCUMENTS

| | | | |
|---|---|---|---|
| 3,581,504 | 6/1971 | Andrus | 60/39.462 |
| 3,898,794 | 8/1975 | Ariga | 60/39.462 |
| 4,047,380 | 9/1977 | Heffernan . | |
| 4,059,415 | 11/1977 | Kosaka et al. | 60/39.462 |

FOREIGN PATENT DOCUMENTS 48-99510 12/1973 Japan .
52-39527 3/1977 Japan .

*Primary Examiner*—Louis J. Casaregola
*Attorney, Agent, or Firm*—Oliff & Berridge

[57] ABSTRACT

The apparatus of the present invention is configured of a combustion gas creation portion for creating a combustion gas comprising oxygen and water vapor from the decomposition of a low concentrated hydrogen peroxide that is adjusted to be at a concentration of 60% or less for storage, and a gas generation vessel for creating a high-temperature, high pressure gas for driving a turbine by causing the thus created combustion gas to react with a fuel. A particular feature of the present invention is the way in which cooling passageways that function as the combustion gas creation portion are formed from a catalyst. The result is a combustion gas which is less toxic, is stable in storage, and has no danger of explosion, and is thus extremely easy to handle and safe when used as an oxidizing agent, and which can also suppress the oxidation and loss of high-temperature components and can increase thermal efficiency to enable higher outputs with lower fuel consumption.

11 Claims, 2 Drawing Sheets

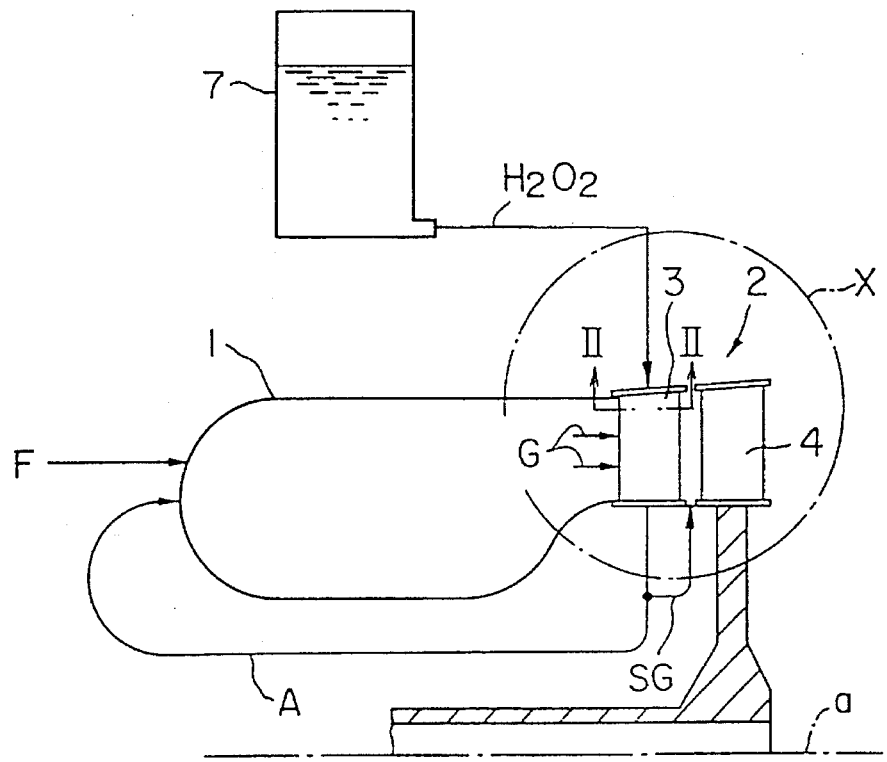
FIG. 1
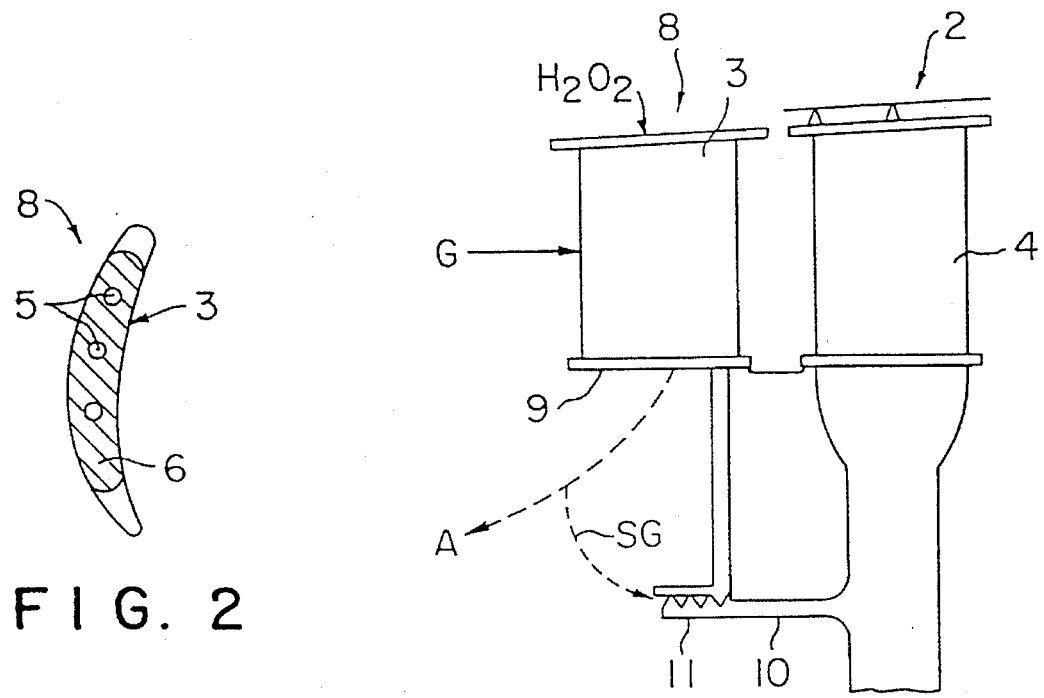
FIG. 2
FIG. 3

5,477,672

HIGH-TEMPERATURE, HIGH-PRESSURE GAS GENERATION APPARATUS FOR TURBINE DRIVE

BACKGROUND OF THE INVENTION

The present invention relates to a high-temperature, high-pressure gas generation apparatus for a turbine drive that can be applied to an aeronautical propulsion engine such as an air turbo-ram jet (rocket), a marine propulsion engine such as that for a torpedo, or an industrial power-generating unit used where there is no atmosphere. In particular, it relates to a high-temperature, high-pressure gas generation apparatus that uses hydrogen peroxide as an oxidizing agent for a liquid fuel.

Hydrogen peroxide, which is a compound of oxygen and hydrogen, decomposes readily in the presence of a catalyst or heat to form a high-temperature combustion gas comprising oxygen ($O_2$) and water vapor ($H_2O$). If a combustion gas of this type could be used as an oxidizing agent for a liquid fuel, it would form a more effective oxidizing agent from the pollution-prevention viewpoint than when the oxygen in the atmosphere, which contains a large quantity of nitrogen components, is used as an oxidizing agent, because no harmful substances such as nitrogen oxides (NOx) would be generated as combustion products. The above described combustion gas created by the decomposition of hydrogen peroxide ($H_2O_2$) contains active oxygen in the initial stages of its creation, which, since it is heated by the heat of decomposition, is extremely reactive. For that reason, if this gas is used as an oxidizing agent, various fuels (not only the hydrocarbon fuels that have been in general use from the past, but also various types of low-quality fuels) will react rapidly to generate a high-temperature, high-pressure gas for driving a turbine.

This characteristic of hydrogen peroxide ($H_2O_2$) has in the past prompted many proposals for high-temperature, high-pressure gas generation apparatuses for driving turbines that use hydrogen peroxide ($H_2O_2$) as an oxidizing agent for a liquid fuel instead of the oxygen in the atmosphere.

In one proposal, disclosed in Japanese Patent Laid-Open No. 48-99509 and Japanese Patent Laid-Open No. 52-37527, hydrogen peroxide stored in a tank or the like is introduced into a decomposition chamber provided with a catalytic layer or a decomposition chamber provided with a heat source, to decompose it and thus create a mixed gas comprising superheated steam or water vapor and oxygen by the action of the catalyst or the heat. A fuel is then supplied into this mixed gas in such a manner that the reaction between the gas and fuel generates a gas for driving a turbine. However, in both of these variations, the characteristics required of the mixed gas created by the decomposition of the hydrogen peroxide mean that a high concentrated hydrogen peroxide of a concentration exceeding 60% must be used. This concentration and all others within the current application are expressed in terms of weight.

In another known proposal, disclosed in the specification of U.S. Pat. No. 4,047,380, a low concentrated hydrogen peroxide of a concentration of 60% or less is used, this is decomposed into oxygen and water vapor, but only the oxygen therein is employed to react with a fuel in a gas generation vessel and thus create a high-temperature, high-pressure gas for driving a turbine.

However, both of the above described prior art techniques have problems. With the former technique that uses a high concentrated hydrogen peroxide, the hydrogen peroxide is highly toxic, it is not stable when it is being stored, and there is danger of explosion, so that the handling thereof is extremely difficult. Further, since the oxygen concentration in the decomposed gas is high, severe oxidation and loss occurs in the high-temperature components, causing problems from the durability point of view.

The latter prior art technique also has problems in that, although it uses a low concentrated hydrogen peroxide which is less toxic and is also extremely stable when stored, only the oxygen is active as an oxidizing agent that reacts with the fuel, so that the oxygen concentration must be high and thus the durability problem caused by the oxidation and loss of the high-temperature components is not solved.

SUMMARY OF THE INVENTION

In the light of the above described situation, a main objective of the present invention is to provide a high-temperature, high-pressure gas generation apparatus for driving a turbine that can suppress oxidation and loss of high-temperature components while using a low concentrated hydrogen peroxide which is less toxic, has superior storage stability, has little danger of explosion, and is thus easy to handle, and that can also enable a reduction in fuel consumption and an increase in output by improving the thermal efficiency.

Another objective of the present invention is to efficiently utilize the hydrogen peroxide to cool various parts of the turbine and thus enable a design of the overall apparatus that is smaller and lighter, and also enable an increase in the sealing of the high-temperature components to improve the durability and performance thereof.

In order to achieve the above objectives, the present invention provides a high-temperature, high-pressure gas generation apparatus for driving a turbine that is configured with a combustion gas creation portion for creating a combustion gas comprising oxygen and water vapor from the decomposition of a low concentrated hydrogen peroxide that is adjusted to be at a concentration of 60% or less for storage, and a gas generation vessel for creating a high-temperature, high-pressure gas for driving a turbine by causing the thus created combustion gas to react with a fuel.

In the high-temperature, high-pressure gas generation apparatus for driving a turbine of the present invention, part of the combustion gas created by the decomposition of the hydrogen peroxide can be used as a sealing gas introduced into a seal portion between stationary and rotating portions of the turbine.

The present invention also provides a high-temperature, high-pressure gas generation apparatus for driving a turbine in which a gas generation vessel thereof comprises a liner that forms a gas creation chamber and a casing that surrounds the periphery thereof, such that the liner is made of a catalyst that promotes the decomposition of hydrogen peroxide is formed of a catalyst that promotes the decomposition of the hydrogen peroxide, and the low concentrated hydrogen peroxide that has had its concentration adjusted to 60% or less for storage is supplied to the gas creation chamber in a state such that it is passed through a plurality of locations in the liner made of catalyst. The configuration is such that the hydrogen peroxide is decomposed therein to form a combustion gas comprising oxygen and water vapor, and a high-temperature, high-pressure gas for driving a turbine is created by the reaction between this combustion gas and a fuel that is supplied separately from the low concentrated hydrogen peroxide.

Since a low concentrated hydrogen peroxide of a concentration that has been adjusted to be 60% or less is used as an oxidizing agent for the creation of a high-temperature, high-pressure gas for driving a turbine by the reaction with a fuel, in accordance with the high-temperature, high-pressure gas generation apparatus of the present invention, not only is toxicity reduced, but also extremely easy and safe handling is enabled because of the excellent storage stability and the lack of danger of explosion of the hydrogen peroxide. A further advantage of using a low concentrated hydrogen peroxide lies in the way that the oxygen concentration in the combustion gas comprising oxygen and water vapor is roughly that of the atmosphere, even though the decomposition is complete, so that oxidation and loss of high-temperature components is suppressed and the components have excellent durability. In addition, since water vapor is included in the combustion gas created by the decomposition, which helps cool the various parts of the turbine, an increase in thermal efficiency can be expected and thus a higher output at a lower fuel consumption is enabled.

A particular feature of the present invention is the way in which the effect of cooling the turbine nozzle and the effect of decomposing the hydrogen peroxide are achieved simultaneously by passing the low concentrated hydrogen peroxide through cooling passageways formed of the catalyst in the turbine nozzle, removing the need for a special decomposition chamber for the decomposition of the hydrogen peroxide, so that the cooling passageways in the turbine nozzle also function as a decomposition chamber and thus the overall configuration of the apparatus can be simplified and made smaller, and a further increase in thermal efficiency is enabled.

Since a sealing gas in a seal portion between stationary and rotary portions of the turbine nozzle can be achieved by feeding in part of the combustion gas created by the decomposition of the low concentrated hydrogen peroxide, there is no need for a separate source for the sealing gas, enabling a reduction in the space occupied by the apparatus and its weight and thus making it easier to increase the lifetime and efficiency of the apparatus while providing a sealing effect for the high-temperature components.

A liner provided in order to suppress the wasteful radiation of heat to the outside of the gas generation vessel also acts as a catalyst that promotes the decomposition of the low concentrated hydrogen peroxide, reducing the number of components to as few as possible. The supply of hydrogen peroxide into the gas creation chamber through a plurality of locations in this liner increases the contact area between the catalyst and the aqueous solution of hydrogen peroxide and ensures a good decomposition effect by the addition of the heating effect of the reaction within the gas creation chamber, so that a large quantity of combustion gas can be generated within a short period of time. At the same time, cooling of the gas generation vessel is enabled and the durability of the entire gas generation vessel is improved.

BRIEF DESCRIPTION OF THE DRAWINGS

FIG. 1 is a schematic diagram of the configuration of a high-temperature, high-pressure gas generation apparatus for driving a turbine in accordance with a first embodiment of the present invention;

FIG. 2 is an enlarged cross-sectional view of a combustion gas creation portion that forms an essential portion of the embodiment shown in FIG. 1, taken along the line II—II;

FIG. 3 is an enlarged cross-sectional view of a seal portion that forms another essential component of the first embodiment shown in FIG. 1, as indicated by the arrow X;

DETAILED DESCRIPTION OF THE PREFERRED EMBODIMENTS

Figure 4:
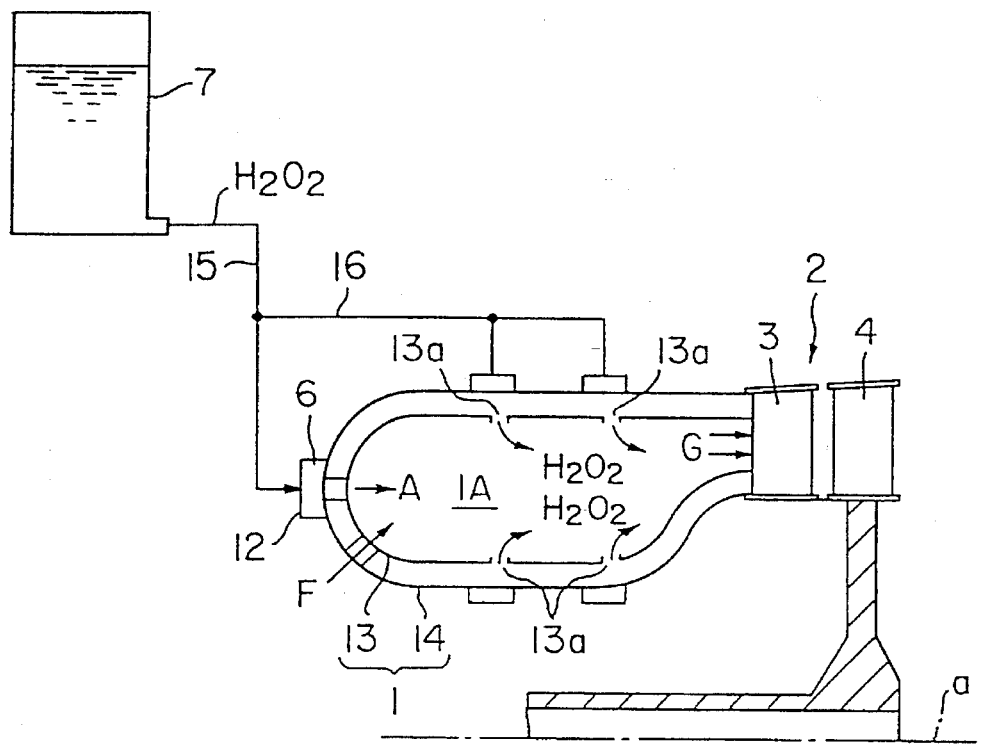
FIG. 4 is a schematic diagram of the configuration of a high-temperature, high-pressure gas generation apparatus for driving a turbine in accordance with a third embodiment of the present invention.

Embodiments of the present invention will be described below with reference to the accompanying drawings.

Embodiment 1

A schematic diagram of the configuration of a high-temperature, high-pressure gas generation apparatus for driving a turbine in accordance with a first embodiment of the present invention iS shown in FIG. 1. In this figure, reference number 1 denotes a gas generation vessel of a configuration such that a high-temperature, high-pressure gas G for driving a turbine that is generated therein is ejected through a turbine nozzle 3 of a gas turbine 2 in the direction of freely rotatable turbine blades 4, to rotatably drive the gas turbine 2.

A plurality of coolant passageways 5 are formed in the turbine nozzle 3 of the gas turbine 2 in such a manner as to penetrate therethrough, as shown in FIG. 2. These coolant passageways 5 are made from a catalyst 6 that promotes a preferred decomposition reaction with respect to hydrogen peroxide in a concentration of 60% or less, such as $MnO_2$, $Cr_2O_3$, Ni, or $KMnO_4$. The configuration is such that a combustion gas A comprising oxygen ($O_2$) and water vapor ($H_2O$) is created by the passage through the coolant passageways 5 made of this catalyst of a low concentrated hydrogen peroxide that is stored in a tank 7 (see FIG. 1) at a concentration of 60% or less, preferably a concentration that has previously been adjusted to be between 50% and 60%. In other words, a combustion gas creation portion 8 is configured wherein the combustion gas A comprising oxygen ($O_2$) and water vapor ($H_2O$) is created by the decomposition of a low concentrated hydrogen peroxide in the above described coolant passageways 5 formed of a catalyst in the turbine nozzle 3.

The combustion gas A comprising oxygen ($O_2$) and water vapor ($H_2O$) that is created in the above described combustion gas creation portion 8 is sprayed into the gas generation vessel 1, a hydrocarbon fuel F is supplied into this spray, and a mixed flow of the gas and fuel is ignited by means of a spark plug or torch igniter (not shown). This causes the combustion gas A and the hydrocarbon fuel F to react, to create the above described high-temperature, high-pressure gas G for driving a turbine.

Part of the combustion gas A comprising oxygen ($O_2$) and water vapor ($H_2O$) that is created in the combustion gas creation portion 8 configured of the coolant passageways 5 of the catalyst is entrained by the turbine blades 4 and an annular stationary portion 9 that fixedly supports the turbine nozzle 3, as shown in FIG. 3, and is guided into a seal portion 11 formed between the turbine blades 4 and a seal support portion 10 that is formed integrally therewith and is free to rotate about the same axis, in such as manner that it is used as a sealant gas SG for the seal portion 11.

In the high-temperature, high-pressure gas generation apparatus for driving a turbine in accordance with this first embodiment of the present invention, the concentration is previously adjusted to be between 50% and 60% and, as shown in FIGS. 1, the low concentrated hydrogen peroxide stored in the tank 7 is decomposed as it is passed through the coolant passageways 5 of catalyst in the turbine nozzle 3 that form the combustion gas creation portion 8, to create the combustion gas A comprising oxygen ($O_2$) and water vapor ($H_2O$). After this decomposition, the combustion gas A is sprayed into the gas generation vessel 1 as an oxidizing agent at the same time that the hydrocarbon fuel F is supplied into this spray, so that the high-temperature, high-pressure gas G for driving a turbine is created by the reaction between the gas and fuel, and this high-temperature, high-pressure gas G for driving a turbine causes the gas turbine 2 to be rotatably driven by being ejected in the direction of the freely rotatable turbine blades 4 through the turbine nozzle 3 of the gas turbine 2.

At the same time, one part (SG) of the combustion gas A created by the combustion gas creation portion 8 is guided into the seal portion 11 between the annular stationary portion 9 of the gas turbine 2 and the seal support portion 10, as Shown in FIG. 3, and this maintains the sealing of these high-temperature portions.

As described above, since a low concentrated hydrogen peroxide is used as an oxidizing agent, not only is toxicity reduced, but also extremely easy and safe handling is enabled because of the excellent storage stability and the lack of danger of explosion of the hydrogen peroxide. In addition, since the oxygen concentration in the combustion gas comprising oxygen and water vapor is roughly that of the atmosphere, oxidation and loss of high-temperature components can be suppressed and thus the durability of components can be promoted. The passing of the low concentrated hydrogen peroxide through the coolant passageways 5 of the turbine nozzle 3 and the decomposition thereof can simultaneously achieve a cooling effect on the turbine nozzle 3 and a decomposition effect of the hydrogen peroxide. An increase in thermal efficiency can be expected from the water vapor included in the combustion gas created by this decomposition, since this helps cool the gas generation vessel 1 and the various parts of the turbine. In addition, since a sealing gas is provided for the seal portion 11 from the combustion gas created by the decomposition, there is no need to provide a separate source for the sealing gas, which makes it easier to reduce the space occupied by the apparatus and reduce its weight.

Embodiment 2

A second embodiment of the present invention differs from the above described first embodiment only in that the low concentrated hydrogen peroxide is decomposed by the heat retained by the turbine nozzle 3 to create the combustion gas A comprising oxygen ($O_2$) and water vapor ($H_2O$), while the low concentrated hydrogen peroxide is passing through the coolant passageways 5 of the turbine nozzle 3 of the gas turbine 2 shown in FIG. 1 and FIG. 2, but is otherwise the same as the first embodiment in both configuration and action.

Embodiment 3

A schematic diagram of the configuration of a high-temperature, high-pressure gas generation apparatus for driving a turbine in accordance with a third embodiment of the present invention is shown in FIG. 4. In this figure, reference number 1 denotes a gas generation vessel of a configuration such that a high-temperature, high-pressure gas G for driving a turbine that is generated therein is ejected through a turbine nozzle 3 of a gas turbine 2 in the direction of freely rotatable turbine blades 4, to rotatably drive the gas turbine 2.

Reference number 12 in FIG. 4 denotes a combustion gas creation portion formed of a catalyst 6 that promotes a preferred decomposition reaction with respect to hydrogen peroxide that is in a concentration of 60% or less, such as $MnO_2$, $Cr_2O_3$, Ni, or $KMnO_4$. This catalyst 6 is attached to a front end portion of the gas generation vessel 1 and a combustion gas A comprising oxygen ($O_2$) and water vapor ($H_2O$) is created by the decomposition of a low concentrated hydrogen peroxide while the low concentrated hydrogen peroxide that is stored in a tank 7 at a concentration of 60% or less, preferably a concentration that is previously adjusted to be between 50% and 60%, is passing through the combustion gas creation portion 12 formed of this catalyst 6, and the thus created combustion gas A is sprayed into the gas generation vessel 1.

As shown in FIG. 4, the gas generation vessel 1 comprises a liner 13 that forms a gas creation chamber 1A and a casing 14 that surrounds the outer periphery thereof, with the configuration being such that the low concentrated hydrogen peroxide is supplied into the gas creation chamber 1A through piping 16 branching from a supply pipe 15 for supplying the low concentrated hydrogen peroxide into the combustion gas creation portion 12 and spray holes 13a formed in the liner 13. Note that the configuration of the gas turbine 2 itself is the same as in the prior art.

In the high-temperature, high-pressure gas generation apparatus for driving a turbine in accordance with this third embodiment of the present invention, the low concentrated hydrogen peroxide, which has previously been adjusted so that its concentration is between 50% and 60% and which is stored in the tank 7, is decomposed as it is passed through the catalyst 6 that forms the combustion gas creation portion 12, to create the combustion gas A comprising oxygen ($O_2$) and water vapor ($H_2O$). After this decomposition, the combustion gas A is sprayed into the gas generation vessel 1 as an oxidizing agent at the same time that the hydrocarbon fuel F is supplied into this spray, so that the high-temperature, high-pressure gas G for driving a turbine is created stably by the reaction between the gas and fuel at close to the optimum theoretical ratio. In this case, a gas G for driving a turbine can be obtained at any desired quantity and temperature below that of the permissible temperature of the gas turbine 2, by diverting a suitable quantity of the low concentrated hydrogen peroxide through the piping 16 branching off the supply pipe 15 that supplies the low concentrated hydrogen peroxide into the combustion gas creation portion 12 and through the plurality of spray holes 13a formed in the liner 13, to supply it into the gas creation chamber 1A. This part of the low concentrated hydrogen peroxide supplied through the spray holes 13a of the liner 13 also enables cooling of the liner 13, and thus of the gas generation vessel 1.

Embodiment 4

Figure 5:
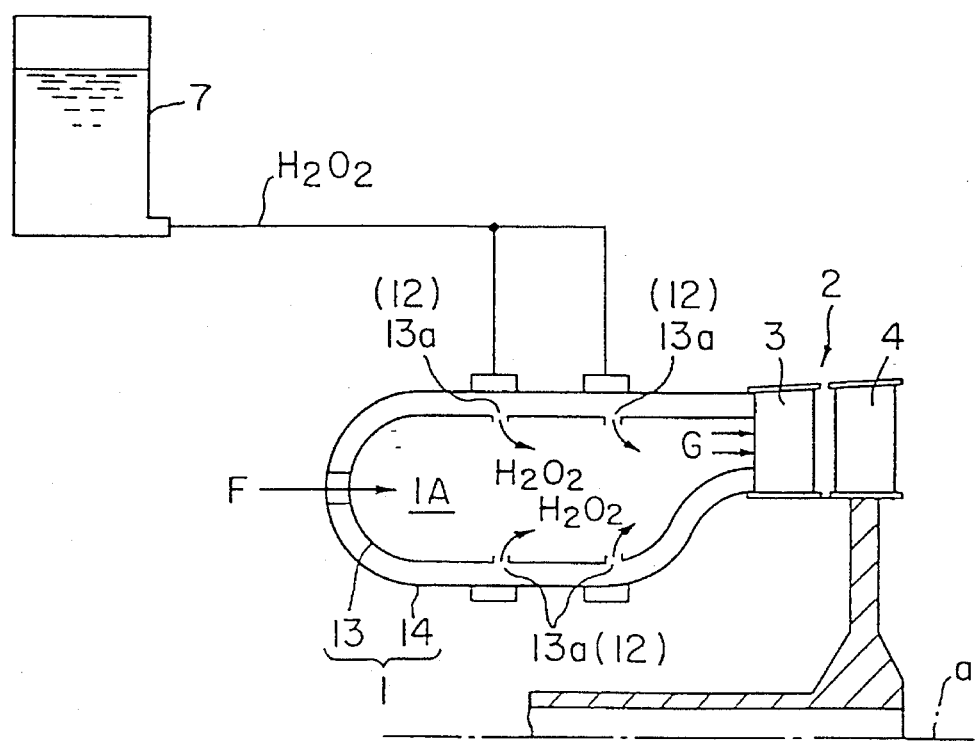
FIG. 5 is a schematic diagram of the configuration of a high-temperature, high-pressure gas generation apparatus for driving a turbine in accordance with a fourth embodiment of the present invention.

A schematic diagram of the configuration of a high-temperature, high-pressure gas generation apparatus for driving a turbine in accordance with a fourth embodiment of the present invention is Shown in FIG. 5. The gas generation vessel 1 of this fourth embodiment is similar to that of the third embodiment in that it comprises a liner 13 that forms a gas creation chamber 1A and a casing 14 that surrounds the outer periphery thereof. The liner 13 that is the inner part thereof is formed of a catalyst that promotes the decomposition of hydrogen peroxide, and a plurality of spray holes 13a formed in the liner 13 of this catalyst form a gas creation portion 12 for the combustion gas A, and the hydrocarbon fuel F is supplied alone from the front end portion of the gas generation vessel 1.

In the high-temperature, high-pressure gas generation apparatus for driving a turbine in accordance with this fourth embodiment of the present invention, the liner 13 that is provided in order to suppress the wasteful radiation of heat to the outside of the gas generation vessel 1 also acts as a catalyst that promotes the decomposition of the low concentrated hydrogen peroxide, enabling a reduction in the number of components in comparison with the third embodiment in which a catalyst is provided separately from the gas generation vessel 1. By supplying the hydrogen peroxide into the gas creation chamber 1A through the spray holes 13a in a plurality of locations in the liner 13, the area of contact between the catalyst and the hydrogen peroxide can be increased, and also the heat of reaction within the gas creation chamber 1A can be used for heating so that the catalytic effect can create a large quantity of combustion gas A within a short period of time, both accurately and energetically. At the same time, the gas generation vessel 1 is sufficiently cooled, which enables an increase in the thermal efficiency.

What is claimed is:

1. A high-temperature, high-pressure gas generation apparatus for a turbine drive comprising:
   decomposition gas creation means for creating a decomposition gas comprising oxygen and water vapor from the decomposition of a low concentrated hydrogen peroxide that is adjusted to be at a concentration of 60% weight or less for storage; and
   gas generation means for creating a high-temperature, high-pressure gas for driving said turbine by causing said created decomposition gas to react with a fuel, wherein no liquid water is discharged from said gas generation apparatus prior to processing of the decomposition gas by the gas generation means.

2. The high-temperature, high-pressure gas generation apparatus according to claim 1, wherein cooling passageways made of a catalyst that promotes the decomposition of said hydrogen peroxide are formed in a turbine nozzle.

3. The high-temperature, high-pressure gas generation apparatus according to claim 1, further comprising means for using part of said created decomposition gas as a sealing gas that is introduced into a seal portion between a stationary portion and a rotating portion of the turbine.

4. The high-temperature, high-pressure gas generation apparatus according to claim 1, wherein said decomposition gas creation means is configured of a liner and a casing that surrounds the periphery of said liner, and said liner is formed from a catalyst that promotes the decomposition of hydrogen peroxide.

5. The high-temperature, high-pressure gas generation apparatus according to claim 1, wherein a catalyst that promotes the decomposition of hydrogen peroxide is attached at a front end portion of said combustion gas creation means.

6. The high-temperature, high-pressure gas generation apparatus according to claim 4, wherein a plurality of spray holes are formed in said liner.

7. A high-temperature, high pressure gas generation apparatus for a turbine drive comprising:
   storage means for storing a low concentrated hydrogen peroxide of 60% weight or less;
   decomposition gas creation means for creating a decomposition gas comprising oxygen and water vapor from said low concentrated hydrogen peroxide, said decomposition gas creation means including,
   catalyst means for decomposing said low concentrated hydrogen peroxide and cooling passageways within said catalyst means; and
   gas generation means for creating a high-temperature, high-pressure gas for driving said turbine by causing said created decomposition gas to react with a fuel.

8. The high-temperature, high-pressure gas generation apparatus of claim 7, wherein said catalyst is within said turbine.

9. The high-temperature, high-pressure gas generation apparatus of claim 7, further comprising means for using part of said created decomposition gas as a sealing gas that is introduced into a seal portion between a stationary portion and a rotating portion of said turbine.

10. The high-temperature, high-pressure gas generation apparatus of claim 7, wherein said decomposition gas creation means is configured of a liner and a casing that surrounds the periphery of said liner, and wherein said liner is formed of said catalyst means.

11. The high-temperature, high-pressure gas generation apparatus of claim 10, wherein said cooling passageways are spray holes formed in said liner.

* * * * *